United States Patent
Koreeda et al.

(10) Patent No.: US 10,001,604 B2
(45) Date of Patent: Jun. 19, 2018

(54) CONNECTOR-INCORPORATING PLUG

(71) Applicant: JAPAN AVIATION ELECTRONICS INDUSTRY, LIMITED, Tokyo (JP)

(72) Inventors: Yuichi Koreeda, Tokyo (JP); Hideto Shimazu, Tokyo (JP); Osamu Imaki, Tokyo (JP); Hideo Sugimoto, Tokyo (JP); Naoki Katagiyama, Tokyo (JP); Masaki Ishiguro, Tokyo (JP); Yasutaka Hiroki, Tokyo (JP)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 0 days. days.

(21) Appl. No.: 15/500,254

(22) PCT Filed: May 20, 2015

(86) PCT No.: PCT/JP2015/064490
§ 371 (c)(1),
(2) Date: Jan. 30, 2017

(87) PCT Pub. No.: WO2016/056271
PCT Pub. Date: Apr. 14, 2016

(65) Prior Publication Data
US 2017/0276882 A1    Sep. 28, 2017

(30) Foreign Application Priority Data
Oct. 10, 2014  (JP) .................. 2014-209133

(51) Int. Cl.
G02B 6/38  (2006.01)
(52) U.S. Cl.
CPC ......... *G02B 6/3869* (2013.01); *G02B 6/3816* (2013.01); *G02B 6/3821* (2013.01)
(58) Field of Classification Search
None
See application file for complete search history.

(56) References Cited

U.S. PATENT DOCUMENTS 4,779,952 A    10/1988 Hayashi et al.
8,465,311 B2 *  6/2013 Takamatsu ........... G02B 6/3821
                                                        439/247

(Continued)

FOREIGN PATENT DOCUMENTS

JP    58-78111 A    5/1983
JP    2012-68323 A  4/2012

(Continued)

OTHER PUBLICATIONS

U.S. Appl. No. 15/521,417 to Naoki Katagiyama et al., filed Apr. 24, 2017.

(Continued)

*Primary Examiner* — Uyen Chau N Le
*Assistant Examiner* — Chad H Smith
(74) *Attorney, Agent, or Firm* — Greenblum & Bernstein, P.L.C.

(57) ABSTRACT

A connector-incorporating plug contains a connector to be inserted into and connected to an adapter in a receptacle and is connected to the receptacle. The connector-incorporating plug includes a housing that is located at a back-end side of the connector in a direction of insertion, to hold the connector, a spring pressing the housing in the direction of insertion, a holder that is located in front of a flange portion formed on the housing and that is mounted to the housing, and a shell member. The holder is pressed by the spring through the flange portion to butt against a projection formed on the inner wall of the shell member, and is kept there. The housing is movable with respect to the holder only along a first axis orthogonal to the direction of insertion. The holder is movable with respect to the shell member only along a crossing axis.

18 Claims, 10 Drawing Sheets

(56) References Cited

U.S. PATENT DOCUMENTS

| | | |
|---|---|---|
| 8,678,667 B2 | 3/2014 | Koreeda et al. |
| 8,834,036 B2 | 9/2014 | Aihara |
| 8,992,097 B2 | 3/2015 | Koreeda et al. |
| 9,063,300 B2 | 6/2015 | Torikai et al. |
| 9,176,287 B2 | 11/2015 | Koreeda et al. |
| 9,300,064 B2 | 3/2016 | Takenaga et al. |
| 9,632,262 B2 | 4/2017 | Aihara et al. |
| 2012/0071019 A1 | 3/2012 | Takamatsu |
| 2013/0115810 A1 | 5/2013 | Maruyama et al. |
| 2013/0264821 A1 | 10/2013 | Duck et al. |
| 2013/0322824 A1 | 12/2013 | Isenhour et al. |
| 2015/0104132 A1 | 4/2015 | Koreeda et al. |
| 2016/0154185 A1 | 6/2016 | Mori et al. |

FOREIGN PATENT DOCUMENTS

| | | |
|---|---|---|
| JP | 2013-44952 A | 3/2013 |
| TW | 201324985 A | 6/2013 |
| TW | 201400901 A | 1/2014 |

OTHER PUBLICATIONS

U.S. Appl. No. 15/512,371 to Yuichi Koreeda et al., filed Mar. 17, 2017.

Office Action issued in Taiwan family member Patent Appl. No. 104118932, dated Jul. 1, 2016, along with an english translation thereof.

\* cited by examiner

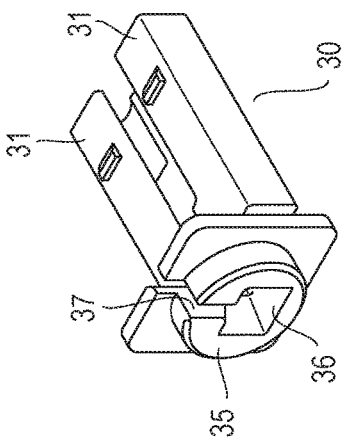
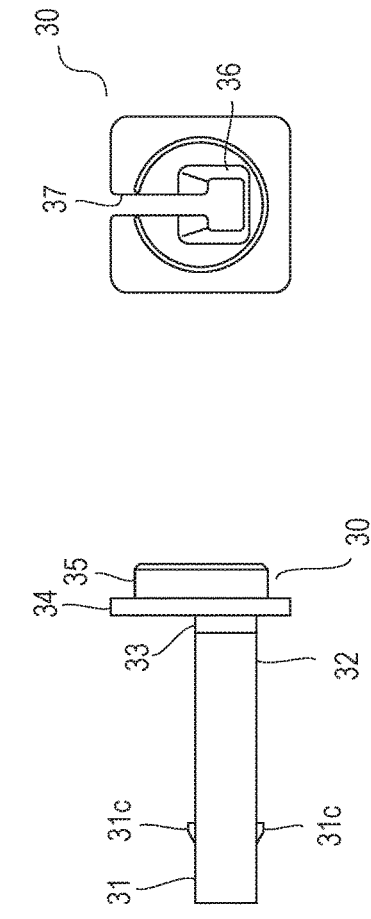
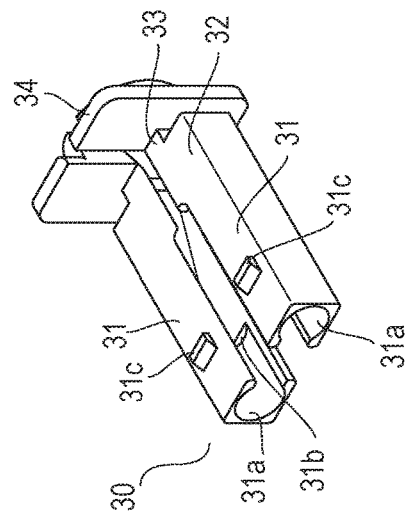
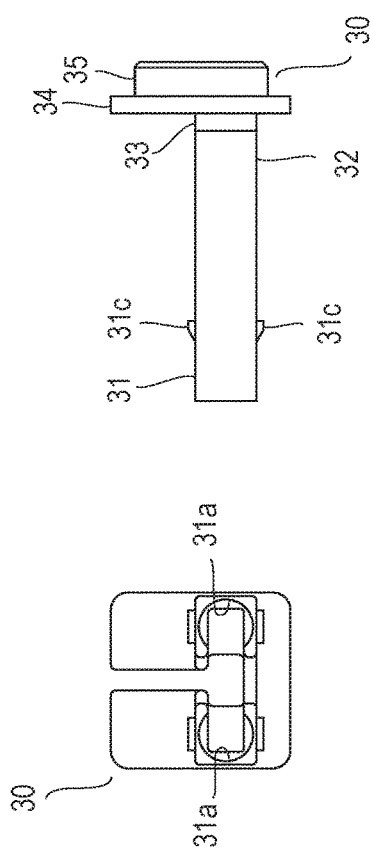

CONNECTOR-INCORPORATING PLUG

TECHNICAL FIELD

The present invention relates to a connector-incorporating plug having a built-in connector.

BACKGROUND ART

FIG. 1 shows a configuration disclosed in Patent Literature 1 as a conventional example of the connector-incorporating plug of this type; in FIG. 1, reference numeral 11 denotes a main body portion, and reference numeral 12 denotes an optical connector inside in the main body portion 11. The optical connector 12 has a latch portion 12a that stops in an engaged state in a mating optical module to which it is connected. Reference numeral 13 denotes a connecting member that is connected to a mating adapter containing the optical module.

PRIOR ART LITERATURE

Patent Literature

Patent Literature 1: Japanese Patent Application Laid Open No. 2013-44952

SUMMARY OF THE INVENTION

Problems to be Solved by the Invention

In the conventional connector-incorporating plug having the configuration as shown in FIG. 1, the optical connector 12 is disposed in a fixed position in the main body portion 11. Accordingly, if the mating optical module to which the optical connector 12 of this connector-incorporating plug is connected and the mating shell (referred to as an adapter in Patent Literature 1) to which the connecting member 13 is connected and into which the main body portion 11 is inserted have poor positional accuracy, there will be a problem that the connector-incorporating plug cannot be connected.

To avoid this type of problem, a floating structure should be adopted so that the built-in connector (optical connector 12) becomes movable with respect to the shell member (main body portion 11); however, if the outer shape of the insertion portion of the connector is rectangular, as in the optical connector 12 shown in Patent Literature 1, for example, the rotation of the connector could make connection impossible even though the floating structure is adopted.

An object of the present invention is to provide a connector-incorporating plug that adopts a floating structure for the built-in connector and that can also restrict the rotation of the connector.

Means to Solve the Problems

According to the present invention, a connector-incorporating plug contains a connector to be inserted into and connected to an adapter in a receptacle and is connected to the receptacle. The connector-incorporating plug includes a housing located at a back-end side of the connector in a direction of insertion, to hold the connector, a spring pressing the housing in the direction of insertion, a holder that is located in front of a flange portion formed on the housing and that is mounted to the housing, and a shell member. The holder is pressed by the spring through the flange portion to butt against a projection formed on the inner wall of the shell member and is kept there. The housing is movable with respect to the holder only along a first axis orthogonal to the direction of insertion. The holder is movable with respect to the shell member only along a crossing axis that is orthogonal to the direction of insertion and also crosses the first axis.

Effects of the Invention

According to the present invention, a floating structure is adopted for the built-in connector, and the rotation of the connector is also restricted. Even if the shell, for example, of the mating receptacle to which the shell member is connected and the adapter, for example, of the mating receptacle to which the connector is connected have poor positional accuracy, and further, even if rotation needs to be restricted since the connector is rectangular, for example, good connection with the mating receptacle can be established.

BRIEF DESCRIPTION OF THE DRAWINGS

FIG. 6A is a front view of a housing shown in FIG. 3A;

FIG. 6B is a side view of the housing shown in FIG. 6A;

FIG. 6C is a rear view of the housing shown in FIG. 6A;

FIG. 6D is a perspective view of the housing shown in FIG. 6A, seen from the front;

FIG. 6E is a perspective view of the housing shown in FIG. 6A, seen from the back;

DETAILED DESCRIPTION OF THE EMBODIMENTS

An embodiment of the present invention will be described next.

Figure 1:
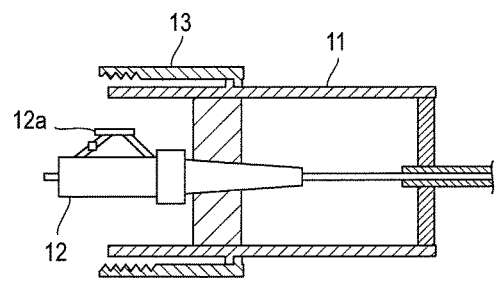
FIG. 1 is a sectional view showing a conventional example of a connector-incorporating plug.
Figure 2B:
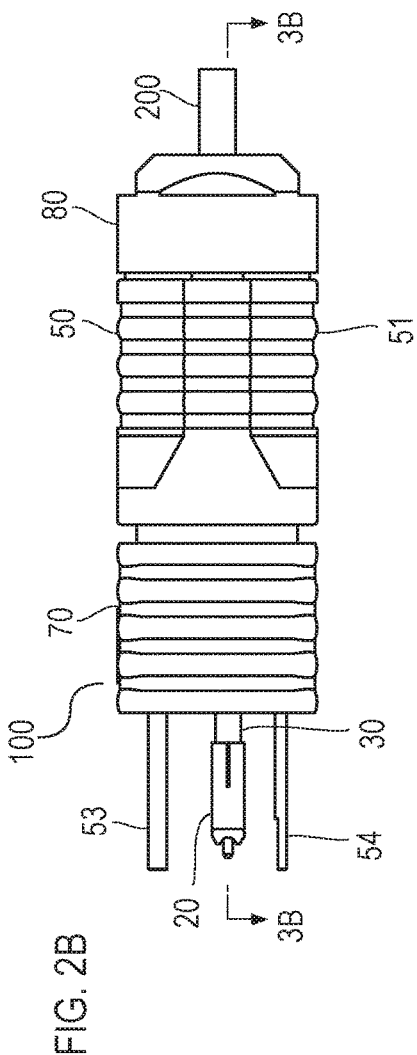
FIG. 2B is a side view of the connector-incorporating plug shown in FIG. 2A.
Figure 2A:
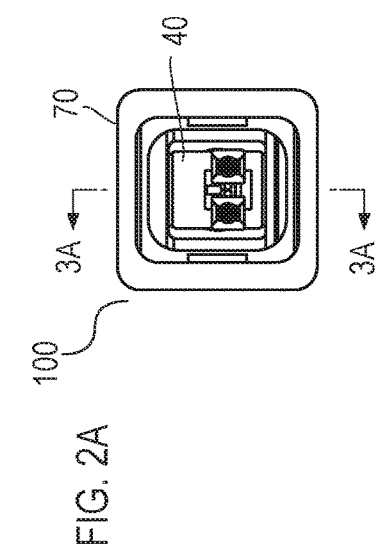
FIG. 2A is a front view showing a connector-incorporating plug according to an embodiment of the present invention.
Figure 2C:
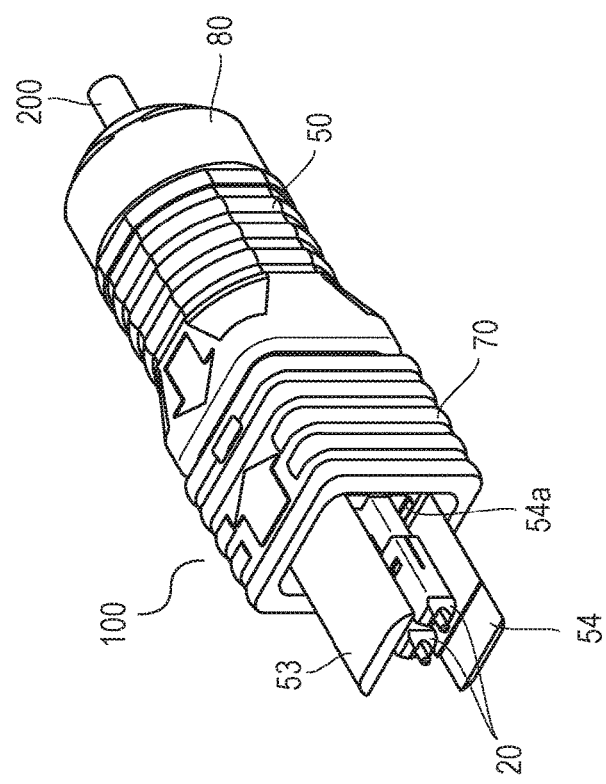
FIG. 2C is a perspective view of the connector-incorporating plug shown in FIG. 2A.
Figure 3A:
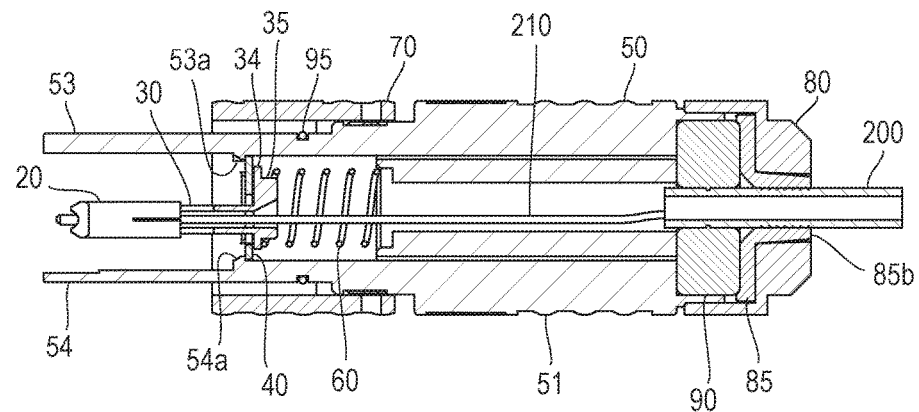
FIG. 3A is an expanded sectional view taken along the line 3A-3A in FIG. 2A.
Figure 3B:
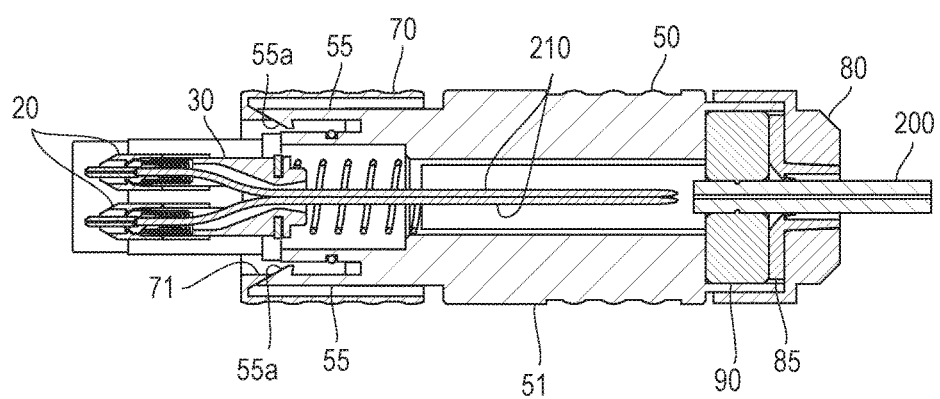
FIG. 3B is an expanded sectional view taken along the line 3B-3B in FIG. 2B.
Figure 4:
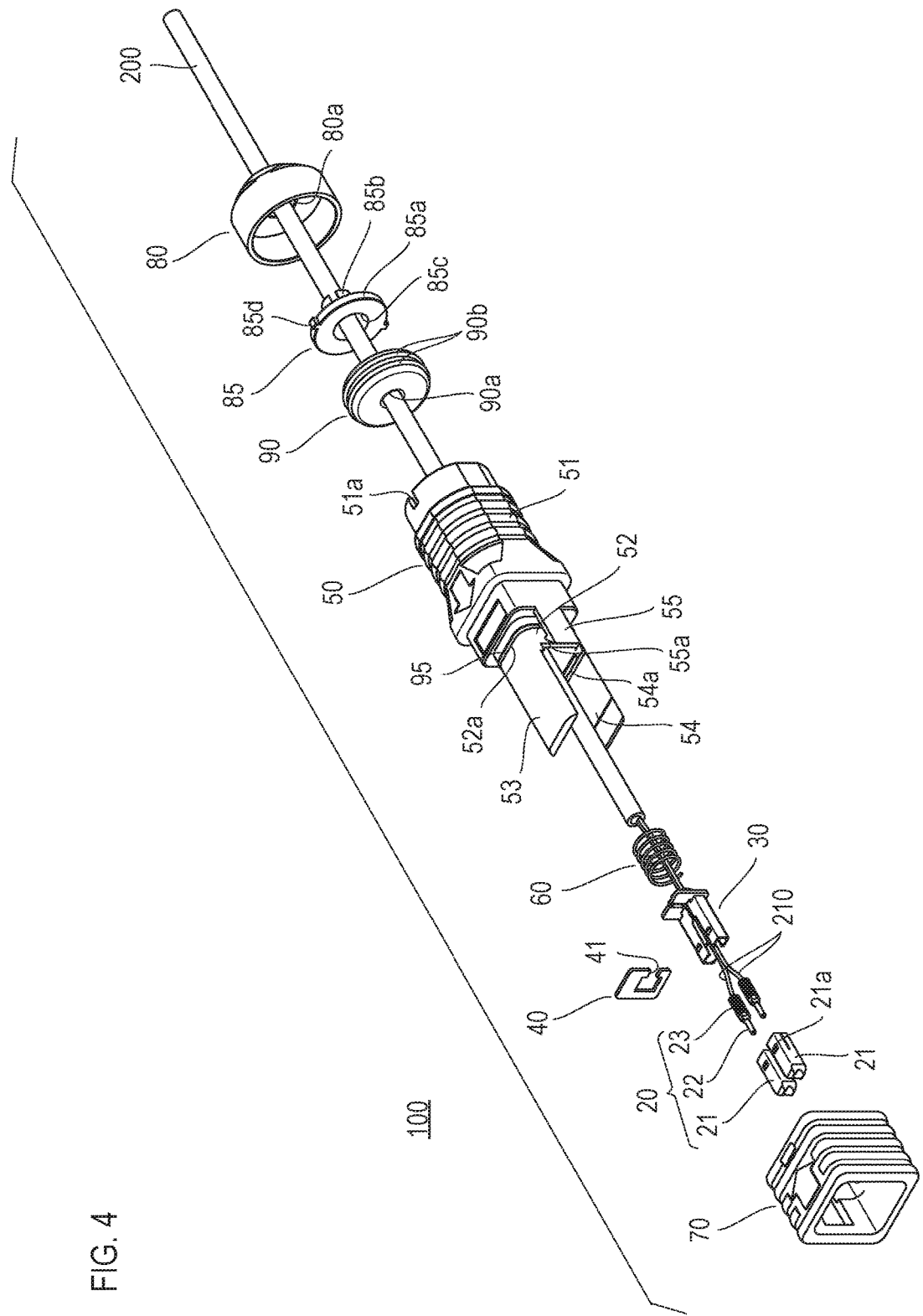
FIG. 4 is an exploded perspective view of the connector-incorporating plug shown in FIG. 2C, seen from the front.
Figure 5:
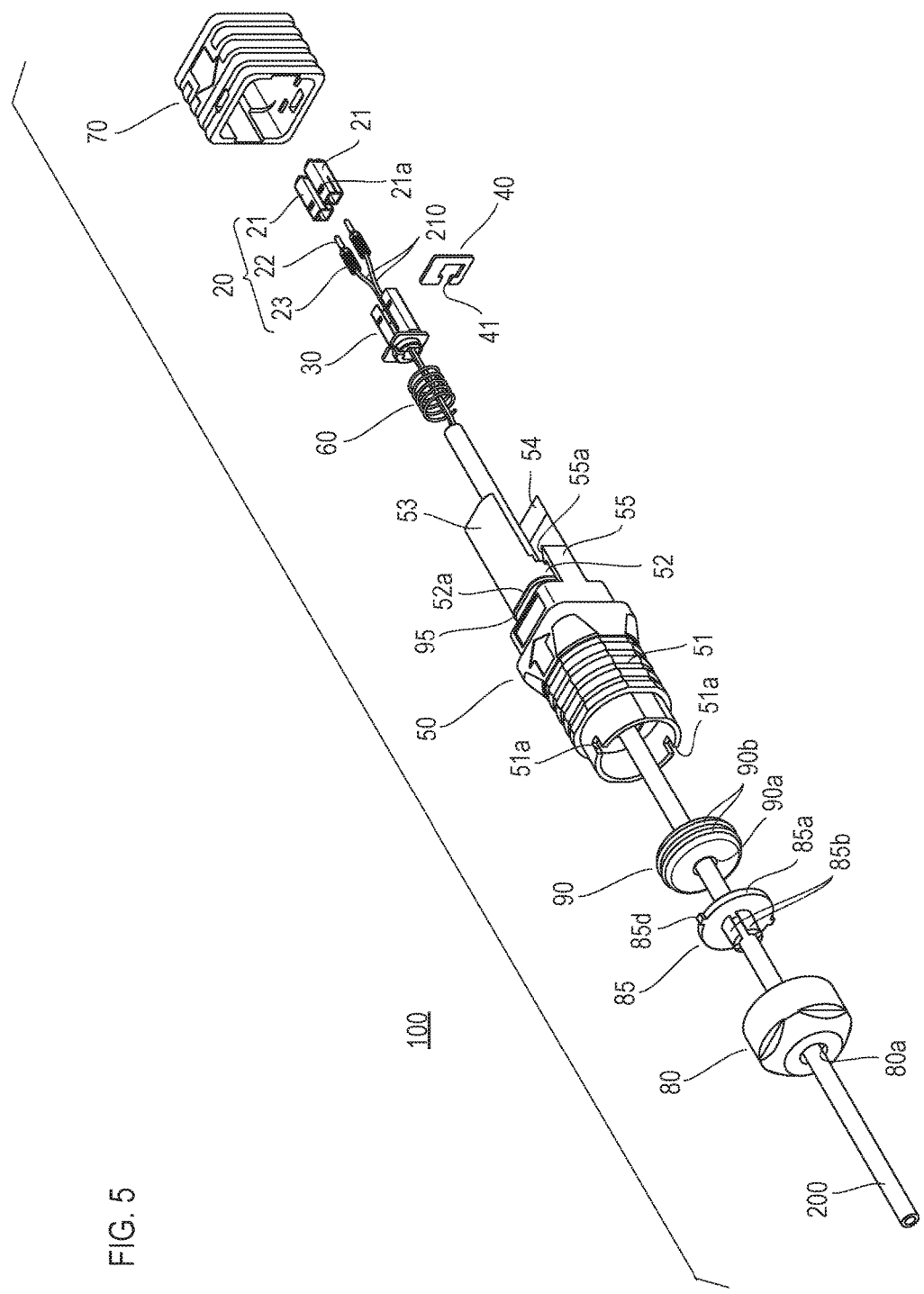
FIG. 5 is an exploded perspective view of the connector-incorporating plug shown in FIG. 2C, seen from the back.

FIGS. 2A to 2C show external views of a connector-incorporating plug according to an embodiment of the present invention, and FIGS. 3A and 3B show its sectional structures. FIGS. 4 and 5 show components in exploded views.

In this embodiment, a connector-incorporating plug 100 includes two optical connectors 20, a housing 30, a holder 40, a shell member 50, a coil spring 60, a coupling member 70, a grand nut 80, a clamp 85, a first waterproof member 90, and a second waterproof member 95. In FIGS. 2B, 2C, 3A, 3B, 4, and 5, reference numeral 200 denotes an optical cable, and reference numeral 210 denotes optical fibers extending out of the optical cable 200.

The configuration of the main components of the connector-incorporating plug 100 will be described first.

In this embodiment, the optical connectors 20 are LC connectors, and FIGS. 4 and 5 show exploded states of the connectors. Each of connector housings 21 has a square cylindrical shape, and the top face and the bottom face have windows 21a formed at the back-end sides. The windows 21a on the bottom faces are hidden and cannot be seen in FIGS. 4 and 5. Ferrules 22 mounted to the ends of the optical fibers 210 are inserted into the connector housings 21 and are held there. Coil springs 23 for the ferrules have a function to press the ferrules 22 in such a direction that they protrude from the openings at the front-end sides of the connector housings 21.

FIGS. 6A to 6E show details of the housing 30; the housing 30 includes a pair of connector holding portions 31, a coupling portion 32 that couples the connector holding portions 31 at the base-end side (rear-end side), a prism portion 33 that extends a little to the back of the coupling portion 32, a flange portion 34 disposed at the rear end of the prism portion 33, and a projecting portion 35 that projects to the back of the flange portion 34.

The connector holding portions 31 have a U-shaped cross section, and the pair of connector holding portions 31 are located and extended in such a manner that the openings of the U shapes face each other. The inner walls of the connector holding portions 31 have a cylindrical surface at the tip-end side (front-end side) and function as containing portions 31a for the coil springs 23 for the ferrules, and butting faces 31b against which the coil springs 23 for the ferrules butt are formed at the back ends of the containing portions 31a. At the front-end side of each connector holding portion 31, one projection 31c is formed to protrude from each of the top face and the bottom face.

The coupling portion 32 has an outer shape obtained by extending the outer shapes of the pair of connector holding portions 31, and the prism portion 33 has a narrower width than the coupling portion 32. The flange portion 34 is shaped like a rectangular plate, and the projecting portion 35 is shaped like a circular cylinder. A rectangular hole 36 is formed in the projecting portion 35, the flange portion 34, the prism portion 33, and the coupling portion 32 to pass through them. The cross-sectional area of the rectangular hole 36 in the prism portion 33 is the smallest, and the cross-sectional area increases gradually toward the front and the back (see FIG. 3B). The coupling portion 32, the prism portion 33, the flange portion 34, and the projecting portion 35 have a slit 37 formed on and above the rectangular hole 36 and extended to the rectangular hole 36.

The holder 40 is a plate having a rectangular frame shape with a notch 41 formed at one place, and the dimension of the notch 41 in the Y direction (vertical direction) is a little narrower than the dimension of the prism portion 33 in the Y direction (vertical direction).

The shell member 50 forms the shell of the connector-incorporating plug 100 and includes a hollow main body portion 51, a square cylinder portion 52 formed to protrude forward from the main body portion 51, positioning pieces 53 and 54 formed to protrude forward from the front ends of the top face and the bottom face of the square cylinder portion 52, respectively, and a pair of connecting pieces 55 formed to protrude forward from the main body portion 51 and to be located at left and right sides of the square cylinder portion 52. The pair of connecting pieces 55 have inward lugs 55a formed to protrude from the front ends and to face each other. A groove 52a is formed on the periphery of the square cylinder portion 52, and the second waterproof member 95, formed of an O ring in this embodiment, fits into the groove 52a. The outer wall of the back end of the main body portion 51 is threaded, but the thread is not shown in the figures.

The coupling member 70 has a square cylindrical shape.

The grand nut 80 is shaped like a circular cylinder, and a hole 80a is formed at the center of the closed back end face. The inner wall of the front end of the grand nut 80 is threaded, which is not shown in the figures, and the thread is mated with the thread at the back end of the shell member 50.

The clamp 85 includes a disc portion 85a and a clamp portion 85b formed to protrude from the back of the disc portion 85a. The disc portion 85a has a hole 85c formed in its center, and the clamp portion 85b has the shape of a circular cylinder surrounding the hole 85c and divided into four parts at intervals of 90 degrees. Projecting portions 85d are formed to protrude from the outer wall of the disc portion 85a at positions forming an angle of 180°, and they are inserted and positioned into a pair of notches 51a formed at the back end of the main body portion 51 of the shell member 50.

The first waterproof member 90 has a disc shape and is made of rubber. The first waterproof member 90 has a hole 90a formed in its center and a plurality of annular projecting portions 90b formed on the outer wall.

The assembly of the components will be described next.

First, the optical cable 200 is threaded through the hole 80a of the grand nut 80, the hole 85c of the clamp 85, and the hole 90a of the first waterproof member 90 in that order, and further through the shell member 50, and exits from the front end of the shell member 50. The two optical fibers 210 extending out of the optical cable 200 are passed through the coil spring 60 and are passed separately through the coil springs 23 for the ferrules, and then the ferrules 22 are mounted to the ends of the optical fibers 210. The two optical fibers 210 are put into the housing 30 through the slit 37 and are accommodated in the housing 30.

Next, the two ferrules 22 are separately inserted into the connector housings 21 from the back of the connector housings 21, and then the pair of connector holding portions 31 of the housing 30 are respectively inserted into the two connector housings 21. The projections 31c formed on the connector holding portions 31 respectively fit into the windows 21a of the connector housings 21, and consequently the two optical connectors 20 are secured to the housing 30. The back-end sides of the coil springs 23 for the ferrules are fitted into the containing portions 31a of the connector holding portions 31, and the back ends butt against the butting faces 31b.

Figure 7A:
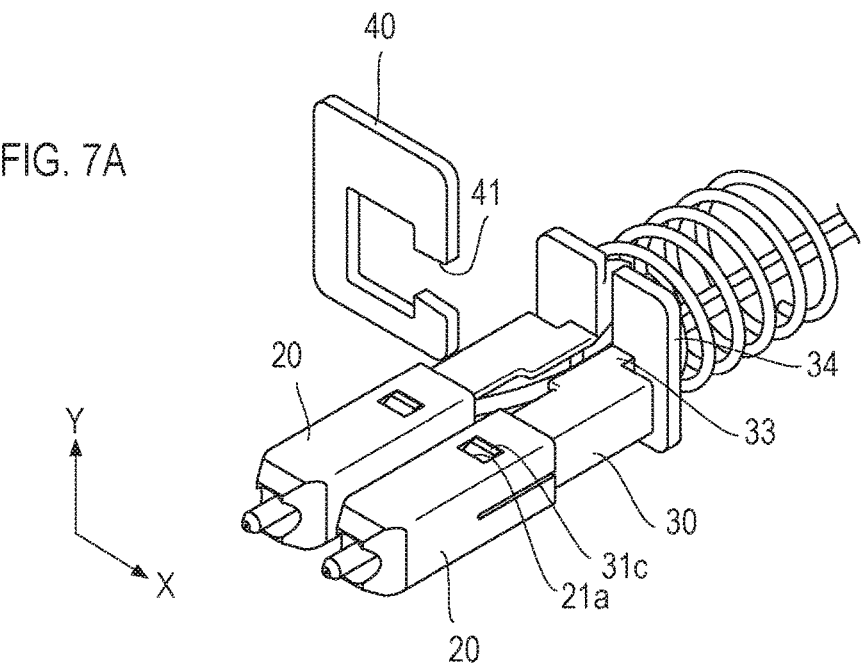
FIG. 7A is a view for illustrating the mounting of a holder to the housing.
Figure 7B:
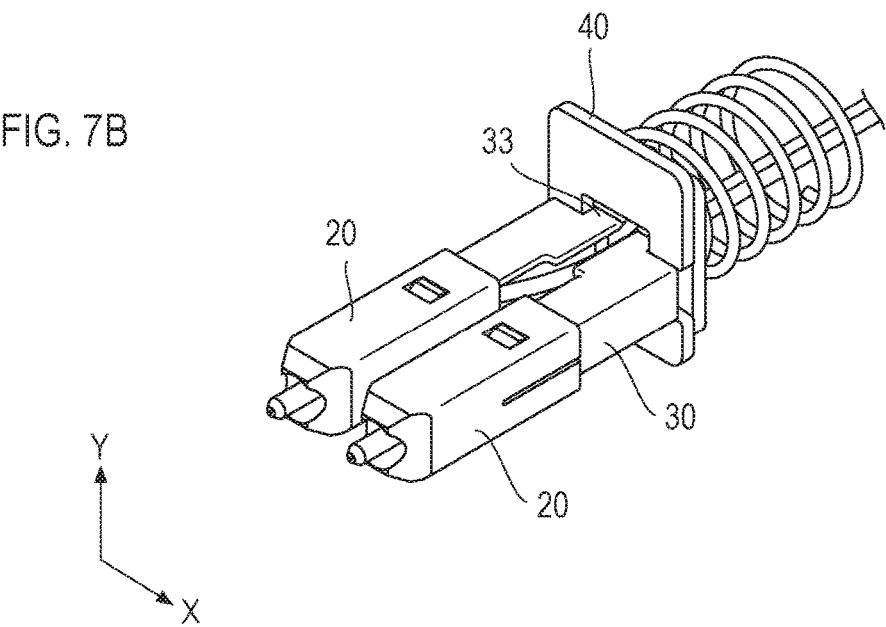
FIG. 7B is a view showing a state in which the holder has been mounted to the housing.

Next, the holder 40 is mounted to the housing 30. FIGS. 7A and 7B show states in which the prism portion 33 of the housing 30 temporarily spreads out the notch 41 of the holder 40 and fits in the frame of the holder 40, and consequently the holder 40 is mounted to the prism portion 33 in front of the flange portion 34. The size of the frame in the holder 40 permits the prism portion 33 to move along a single axis with respect to the holder 40, and in this embodiment, the size permits movement in the positive and negative Y directions (vertical directions), and movement in the positive and negative X directions (horizontal directions) is restricted because the two side faces of the prism portion 33 hit the frame of the holder 40.

Then, the projecting portion 35 of the housing 30 is fitted into one end of the coil spring 60, and the holder 40 mounted to the housing 30 and the coil spring 60 are pressed together into the shell member 50 from the front of the shell member 50. The positioning pieces 53 and 54 of the shell member 50 respectively have projections 53a and 54a formed on the inner faces facing each other at the base ends (see FIG. 3A), and the holder 40 is pressed until the projections 53a and 54a are cleared. The other end of the coil spring 60 butts against the butting face in the shell member 50, and the coil spring 60 is compressed. The holder 40 is pressed against the projections 53a and 54a by the coil spring 60 through the flange portion 34 of the housing 30, as shown in FIG. 3A, and the projections 53a and 54a prevent it from coming off.

The coil spring 60, the holder 40, the housing 30, and the two optical connectors 20 are mounted to the shell member 50 as described above. The coupling member 70 is mounted to the shell member 50 so as to cover the front-end side of the main body portion 51 and the pair of connecting pieces 55 of the shell member 50.

The first waterproof member 90 and the clamp 85 are inserted, in that order, into the back-end side of the main body portion 51 of the shell member 50, and lastly the grand nut 80 is screwed thereinto and mounted thereto. The pair of projecting portions 85d are inserted into the notches 51a of the main body portion 51, and they prevent the clamp 85 from rotating.

When the grand nut 80 is screwed, the clamp portions 85b of the clamp 85 clamp the optical cable 200 tightly, and the first waterproof member 90 is compressed and comes into tight contact with the shell member 50 and the optical cable 200. Consequently, the back-end side of the shell member 50 is sealed.

This ends the assembly, and the connector-incorporating plug 100 shown in FIGS. 2A to 2C, 3A, and 3B is completed.

Figure 8A:
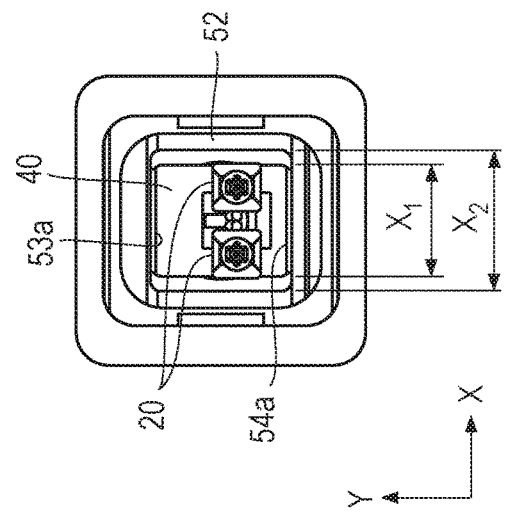
FIG. 8A is a view for illustrating that the holder is movable with respect to the shell member.
Figure 8B:
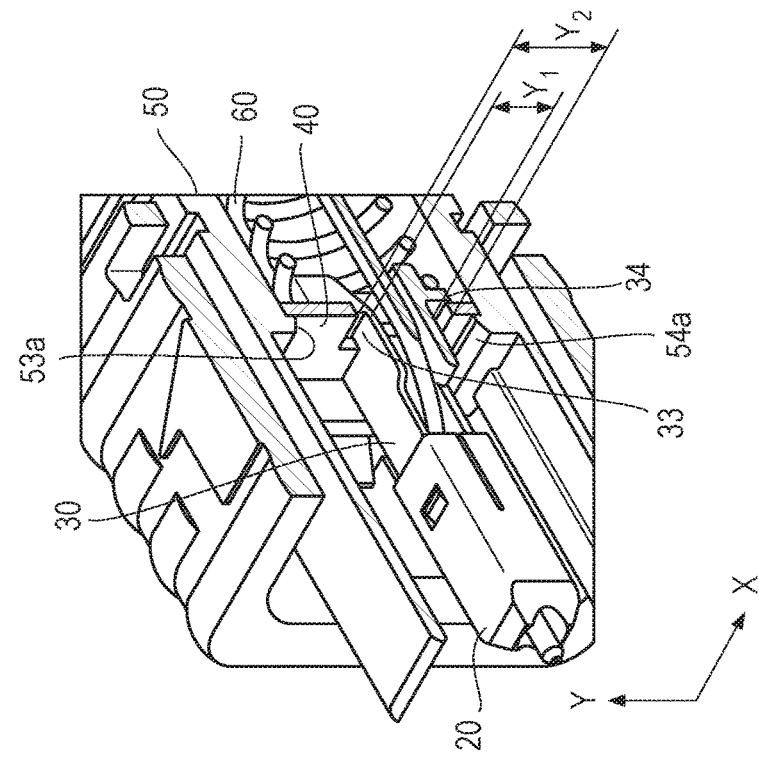
FIG. 8B is a view for illustrating that the housing is movable with respect to the holder.

In the connector-incorporating plug 100 configured as described above, the housing 30, which is located on the back-end side of the optical connector 20 with respect to its direction of insertion (direction of connection), which holds the optical connector 20, and which is pressed by the coil spring 60 in the insertion direction of the optical connector 20, is movable with respect to the holder 40, only in the positive and negative Y directions, which are orthogonal to the insertion direction of the optical connector 20, as described earlier. The holder 40 is movable with respect to the shell member 50 only in the positive and negative X directions (along a single crossing axis), which are orthogonal to the insertion direction of the optical connector 20 and which cross the positive and negative Y directions, and consequently the floating structure of the optical connector 20 is implemented. FIGS. 8A and 8B respectively show the floating structure in the positive and negative X directions and the floating structure in the positive and negative Y directions provided by the connector-incorporating plug 100.

In FIG. 8A, $X_1$ indicates the width of the holder 40, and $X_2$ indicates the width of the inner wall of the square cylinder portion 52 of the shell member 50 where the holder 40 is located. The holder 40 is permitted to move in the positive and negative X directions by the distance equal to the difference between $X_1$ and $X_2$. The inner wall of the square cylinder portion 52 is rectangular, the square cylinder portion 52 encloses the holder 40 and restricts its movement in the positive and negative Y directions (directions of height of the holder 40), and consequently the rotation of the holder 40 is also restricted.

In FIG. 8B, $Y_1$ indicates the height (thickness) of the prism portion 33 of the housing 30, and $Y_2$ indicates the vertical size of the frame in the holder 40. The housing 30 is permitted to move in the positive and negative Y directions by the distance equal to the difference between $Y_1$ and $Y_2$, its movement in the positive and negative X directions is restricted as described earlier, and consequently the rotation of the housing 30 is also restricted.

As described above, according to this embodiment, the connector-incorporating plug 100 adopts a floating structure for the optical connector 20 and also restricts the rotation of the optical connector 20.

According to this embodiment, a spring that presses the housing 30 holding the optical connector 20 is the coil spring 60, and one end of the coil spring 60 is joined to the projecting portion 35 disposed on the housing 30, so that the initial position of the optical connector 20 with respect to the shell member 50 can be brought to the normal position, and consequently the initial position of the optical connector 20 will not depart greatly from the normal position (position of the origin) even though the floating structure is adopted. Therefore, the movable range of the floating structure can be enlarged.

Figure 9:
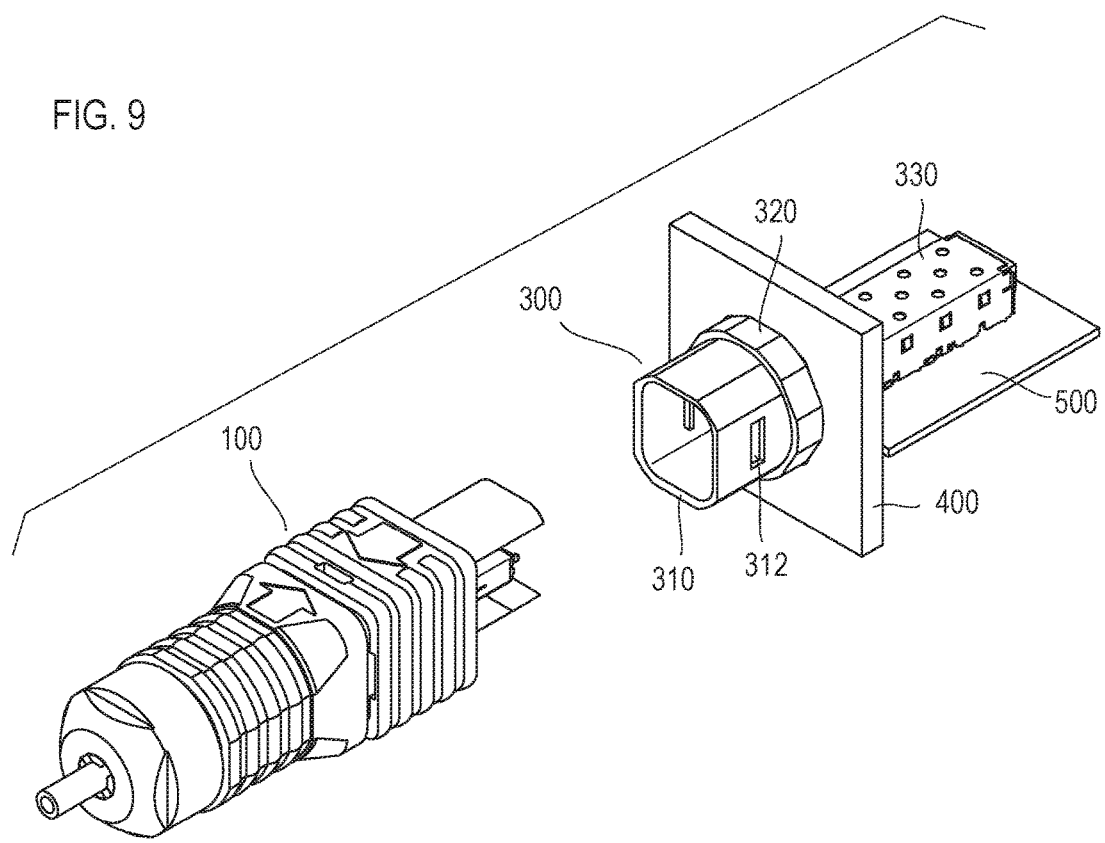
FIG. 9 is a perspective view showing a state before a receptacle and the connector-incorporating plug shown in FIG. 2C are joined.
Figure 10:
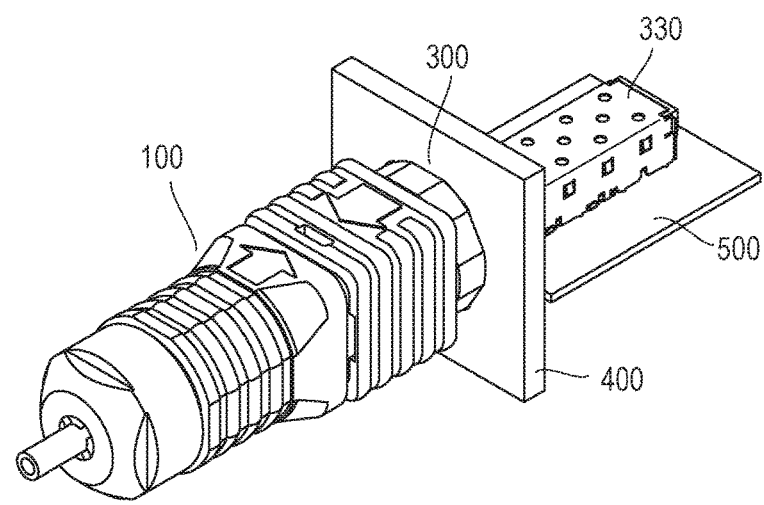
FIG. 10 is a perspective view showing a state after the receptacle and the connector-incorporating plug shown in FIG. 2C are joined.
Figure 11:
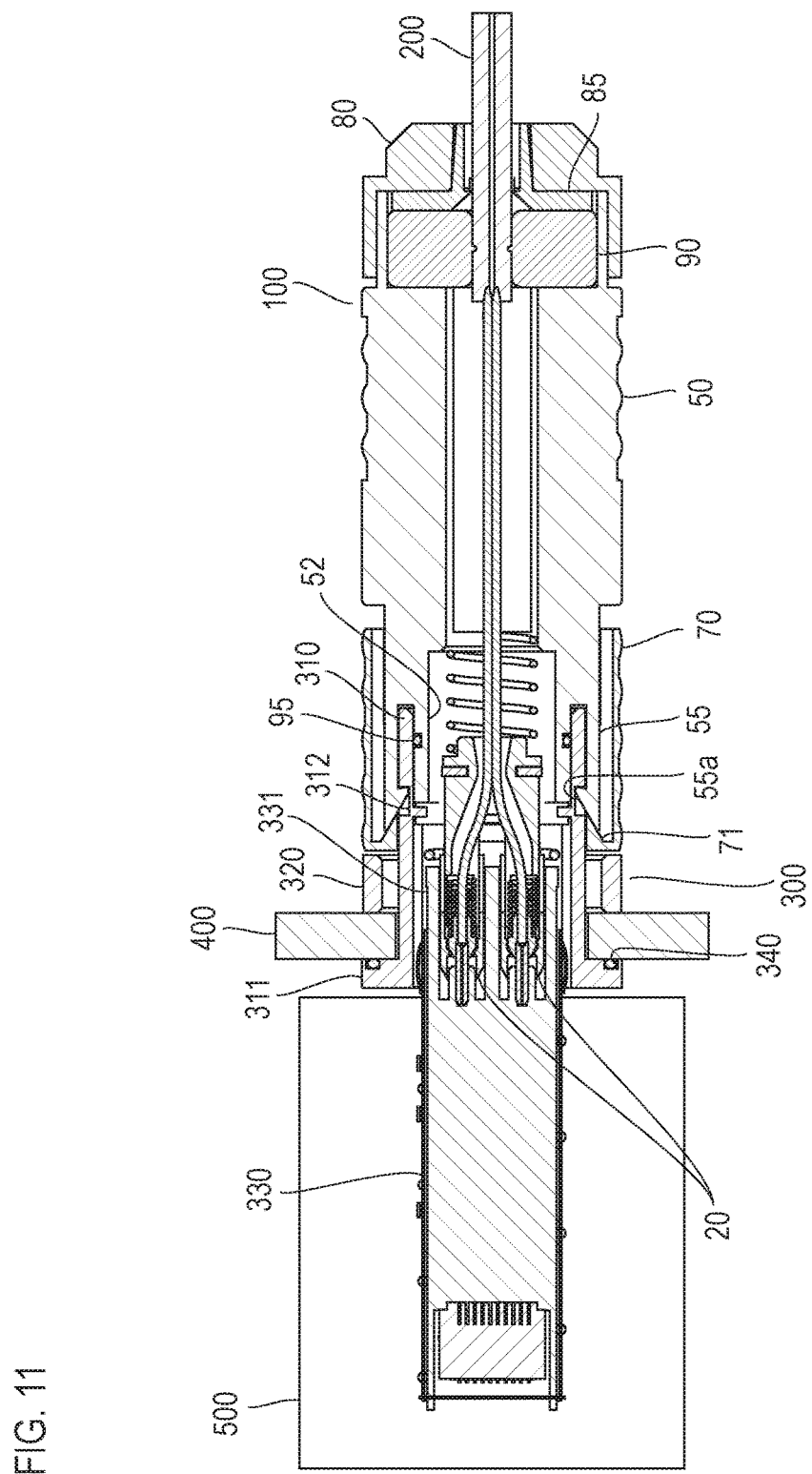
FIG. 11 is an expanded sectional view showing the joined state of the receptacle and the connector-incorporating plug shown in FIG. 10.

FIG. 9 shows the connector-incorporating plug 100 described above and a receptacle 300 to which the connector-incorporating plug 100 is connected, and FIG. 10 shows a state in which the connector-incorporating plug 100 and the receptacle 300 are joined and connected. FIG. 11 shows a sectional structure of the joined state shown in FIG. 10.

The receptacle 300 in this embodiment includes a shell 310, a nut 320, and an optical module 330. A flange 311 is formed at one end of the shell 310, and the shell 310 is mounted to the body 400 of a transmission device, for example, by holding the body 400 tightly between the nut 320 and the flange 311.

The optical module 330 has an adapter 331 at one end and is mounted on a printed wiring board 500. The adapter 331 is inserted into and located in the shell 310, and the printed wiring board 500 is fixed to a stationary member (not shown in the figures), which is not the body 400. Since the shell 310 and the optical module 330 are generally fixed to different members, the positional accuracy of the optical module 330 with respect to the shell 310 is not high enough, and misalignment is likely to occur. The connector-incorporating plug 100 can cope with that type of misalignment and can provide good connection with the receptacle 300.

The optical connectors 20 of the connector-incorporating plug 100 are inserted into the adapter 331 and connected to the optical module 330 as shown in FIG. 11. The shell member 50 is not shown in detail in the figures; however, the pair of positioning pieces 53 and 54 are inserted into and positioned in the shell 310, and the lugs 55a at the ends of the pair of connecting pieces 55 are located in and caught in the depressed portions 312 formed in the shell 310, and consequently the shell member 50 is connected to and fixed to the shell 310. The square cylinder portion 52 of the shell member 50 fits in the shell 310.

The connector-incorporating plug 100 can be detached from the receptacle 300 by moving back the coupling member 70. Lugs 71 are formed on the inner wall of the coupling member 70 at the front-end side, as shown in FIG. 11, and by moving back the coupling member 70, the lugs 71 lift (open) the ends of the pair of connecting pieces 55 such that the lugs 55a of the connecting pieces 55 come off the depressed portions 312 of the shell 310, and consequently the fixed state is released, and the connector-incorporating plug 100 is detached from the receptacle 300.

The back end of the shell member 50 of the connector-incorporating plug 100 is sealed by the first waterproof member 90, as described above. In the state in which the connector-incorporating plug 100 is joined and connected to the receptacle 300, the second waterproof member 95, formed of the O ring located around the square cylinder portion 52 of the shell member 50, is held tightly between the inner wall of the shell 310 and the square cylinder portion 52 and seals the space between them. Therefore, the connector-incorporating plug 100 has excellent waterproofing properties. In the receptacle 300, a waterproof member 340 formed of an O ring is held tightly between the flange 311 of the shell 310 and the body 400, as shown in FIG. 11, and consequently an excellent waterproof structure is implemented.

In the connector-incorporating plug 100 described above, the housing 30 is pressed by the coil spring 60, but the spring that presses the housing 30 in the direction of insertion of the optical connector 20 is not limited to the coil spring 60 and can be a different spring.

The connector-incorporating plug 100 includes the optical connectors 20, but the internal connectors can be electrical connectors, for example.

According to the present invention, while a floating structure for internal connectors is implemented, the rotation of the connectors can be restricted. Therefore, the present invention can provide a connector-incorporating plug that is very useful and suitable if the shape of the connector to be inserted depends on the direction, such as 1) when the connector is rectangular, and the outer geometry orthogonal to the direction of insertion is a polygon,
2) when the connector is round and has a plurality of optical fibers, or
3) when a plurality of connectors are included.

What is claimed is:

1. A connector-incorporating plug containing a connector to be inserted into and connected to an adapter in a receptacle and being connected to the receptacle, the connector-incorporating plug comprising:
   a housing located at a back-end side of the connector in a direction of insertion, to hold the connector;
   a spring pressing the housing in the direction of insertion;
   a holder located in front of a flange portion formed on the housing and mounted to the housing; and
   a shell member;
   the holder being pressed by the spring through the flange portion to butt against a projection formed on an inner wall of the shell member and being kept there;
   the housing being movable with respect to the holder only along a first axis orthogonal to the direction of insertion;
   the holder being movable with respect to the shell member along a crossing axis that is orthogonal to the direction of insertion and that also crosses the first axis, the holder being immovable with respect to the shell member along the first axis.

2. The connector-incorporating plug according to claim 1, wherein the holder has a shape of a rectangular frame with a notch formed at one position;
   the housing is mounted by fitting a prism portion in front of the flange portion into the frame of the holder through the notch; and
   the frame has a size that allows movement of the housing with respect to the holder only along the first axis.

3. The connector-incorporating plug according to claim 2, wherein the inner wall of the shell member has a rectangular shape in a part where the holder is located; and
   the rectangular shape has a size that allows movement of the holder with respect to the shell member along the crossing axis.

4. The connector-incorporating plug according to claim 1, wherein the spring is a coil spring;
   the housing includes a projecting portion at a back of the flange portion; and
   the projecting portion is fitted into one end of the coil spring.

5. The connector-incorporating plug according to claim 2, wherein the spring is a coil spring;
   the housing includes a projecting portion at a back of the flange portion; and
   the projecting portion is fitted into one end of the coil spring.

6. The connector-incorporating plug according to claim 3, wherein the spring is a coil spring;
   the housing includes a projecting portion at a back of the flange portion; and
   the projecting portion is fitted into one end of the coil spring.

7. The connector-incorporating plug according to claim 1, wherein an outer geometry of the connector is polygonal in a plane orthogonal to the direction of insertion.

8. The connector-incorporating plug according to claim 2, wherein an outer geometry of the connector is polygonal in a plane orthogonal to the direction of insertion.

9. The connector-incorporating plug according to claim 3, wherein an outer geometry of the connector is polygonal in a plane orthogonal to the direction of insertion.

10. The connector-incorporating plug according to claim 1, wherein the housing further holds one or more connectors that are the same as the connector.

11. The connector-incorporating plug according to claim 2, wherein the housing further holds one or more connectors that are the same as the connector.

12. The connector-incorporating plug according to claim 3, wherein the housing further holds one or more connectors that are the same as the connector.

13. The connector-incorporating plug according to claim 1, wherein the connector is an optical connector.

14. The connector-incorporating plug according to claim 2, wherein the connector is an optical connector.

15. The connector-incorporating plug according to claim 3, wherein the connector is an optical connector.

16. The connector-incorporating plug according to claim 1, wherein a first waterproof member is located at a back end of the shell member; and
   a second waterproof member is located at a front-end side of the shell member fitted into a shell of the receptacle and is held tightly between an inner wall of the shell and the shell member.

17. The connector-incorporating plug according to claim 2, wherein a first waterproof member is located at a back end of the shell member; and a second waterproof member is located at a front-end side of the shell member fitted into a shell of the receptacle and is held tightly between an inner wall of the shell and the shell member.

18. The connector-incorporating plug according to claim 3, wherein a first waterproof member is located at a back end of the shell member; and a second waterproof member is located at a front-end side of the shell member fitted into a shell of the receptacle and is held tightly between an inner wall of the shell and the shell member.

\* \* \* \* \*